United States Patent [19]

Johnson, III

[11] 4,079,301
[45] Mar. 14, 1978

[54] D.C. MOTOR CONTROL

[75] Inventor: Chandler A. Johnson, III, Sussex, Wis.

[73] Assignee: General Electric Company, Erie, Pa.

[21] Appl. No.: 751,497

[22] Filed: Dec. 17, 1976

[51] Int. Cl.² ............................................. H02P 5/06
[52] U.S. Cl. .................................. 318/338; 318/331; 318/345 AB; 318/326
[58] Field of Search ........ 318/338, 331, 343, 345 CA, 318/345 AB, 268, 310, 315, 433, 434, 438, 326, 327

[56] References Cited

U.S. PATENT DOCUMENTS

| | | | |
|---|---|---|---|
| 3,599,064 | 8/1971 | Friedman | 318/338 |
| 3,935,520 | 1/1976 | Johnson | 318/326 |

Primary Examiner—Robert K. Schaefer
Assistant Examiner—Michael K. Mutter
Attorney, Agent, or Firm—Arnold E. Renner; Philip L. Schlamp

[57] ABSTRACT

A control circuit for a direct current motor having separately excited armature and field windings and operable in both the constant torque and constant horsepower modes includes a speed control circuit having a transfer characteristic providing an extremely high gain at lower frequencies and a low gain, for example unity, at higher frequencies and further includes means to reduce the low frequency gain when motor operation is switched from the constant torque to the constant horsepower mode.

14 Claims, 3 Drawing Figures

4,079,301

D.C. MOTOR CONTROL

BACKGROUND OF THE INVENTION

The present invention relates generally to the control of direct current (d.c.) motors and more particularly to the control of d.c. shunt motors operable in both the constant torque and constant horsepower modes.

It is well known in the art that a d.c. motor having separately excited armature and field windings can be operated in what are commonly called the constant torque and constant horsepower modes. In the constant torque mode, assuming the armature current is maintained at rated value, the maximum torque available from the motor is constant and the horsepower output is proportional to speed. In the constant horsepower mode, again assuming the armature current is maintained at rated value, the maximum horsepower output is constant while the torque varies as a function of the speed. The latter type of operation is achieved, in the case of a d.c. shunt motor, by what is commonly called field weakening. That is, the power supplied to the field winding is reduced to increase speed and the relationship existing is, essentially, that if the field is reduced to produce one-half the original amount of flux, the speed will double.

It is also recognized by those skilled in the art that a closely regulated d.c. motor can become unstable when rapid regulation changes are required as will be more fully described in the detailed specification which follows. This is because certain of the circuit components used in the control are inherently frequency responsive and the motor-load itself, when viewed as a system, is also responsive to frequency. The problem of stability becomes even more acute when motor operation is in the constant horsepower range. This is because the addition of the field control into the system adds an additional gain to the system which multiplies the remaining system gain such that relatively small changes now become larger in total effect.

These instability problems are recognized and numerous solutions have been proposed. Many of these proposed solutions are complex and require a number of adjustments. In U.S. Pat. No. 3,935,520, "DC Motor Regulator" by Chandler A. Johnson, III, which patent is assigned to the assignee of the present invention and was issued on Jan. 27, 1976 and which patent is specifically incorporated hereinto by reference, there is shown a scheme to increase the stability of a motor system in the constant torque region. This patent shows, describes and claims a d.c. motor control circuit including a speed control having a specified transfer characteristic resulting in extremely high gains in response to low frequency signals and a constant gain (e.g., 1) at higher frequencies.

The aforementioned patented invention performs quite adequately within the constant torque range and only a single adjustment is required. That invention does not, however, provide corresponding control when the motor is operative in the constant horsepower range, i.e., when field weakening occurs. The stability problems in the constant horsepower range can be better understood with the following explanation. In the constant torque region, motor speed will vary from zero to base speed by varying the armature voltage from zero to rated volts. Typically, speed might vary from 0 to 1150 rpm with a corresponding variation in armature terminal voltage of from 0 to 240 volts. In the field weakening region, however, it is possible to achieve an increase of approximately 200% in speed with a relatively small increase in armature terminal voltage. That is, the motor speed could rise from 1150 rpm to approximately 3450 rpm with an increase of armature terminal voltage of only from 240 to 245 volts. Thus, it is seen that maintenance of stability and accurate speed control in this latter range can present serious problems.

SUMMARY OF THE INVENTION

It is, therefore, an object of the present invention to provide an improved control circuit for a direct current motor.

It is a further object to provide a control circuit for a d.c. motor which provides enhanced stability in both the constant torque and constant horsepower modes of operation.

It is another object to provide a control circuit for a d.c. motor which is applicable to a large range of different motors and drive systems.

It is a still further object to provide a speed regulator system for a d.c. motor in which the gain is drastically varied when operation is changed between the constant torque and the constant horsepower modes of operation.

The foregoing and other objects are achieved in accordance with the present invention by providing a speed control for a d.c. motor which is operable in both the constant torque and constant horsepower modes by virtue of having separately excited armature and field windings. This control is achieved by providing a basic speed control which has an extremely high gain at lower frequencies and a lower gain, for example unity, at higher frequencies and which further includes means to reduce the low frequency gain when the motor operation is switched from the constant torque to the constant horsepower mode.

DESCRIPTION OF THE DRAWING

While the present invention is described in particularity in the claims annexed to and forming a part of this specification, a better understanding of the invention can be had by reference to the following description when taken in conjunction with the accompanying drawing in which:

DETAILED DESCRIPTION

Figure 1:
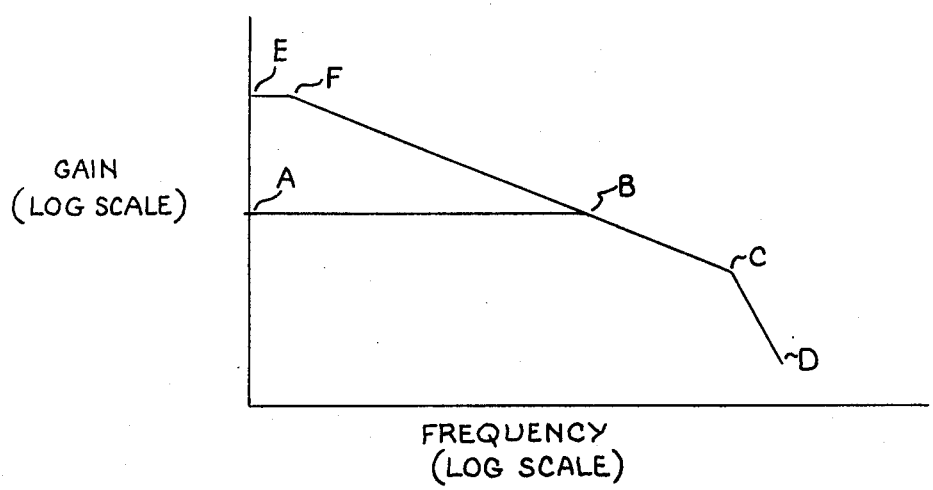
FIG. 1 is a Bode diagram of the transfer characteristic of a typical d.c. motor-load system.

Before beginning a detailed description of the preferred embodiment of the present invention it is believed well to discuss briefly the transfer characteristic of a typical motor-load system which makes the present invention desirable. FIG. 1 is a Bode diagram showing the plot, on logarithmic scales, of gain (ordinate) versus frequency (abscissa). In this case, gain may be considered as a ratio of the motor armature input voltage to the motor speed. In FIG. 1, four points (A, B, C and D) specify motor-load system performance in the constant torque region. As shown, the curve between points A and B shows no slope indicating that in this range the motor speed will closely follow voltage input; that is, any change in the voltage input will result in the proportional change in motor speed. As the frequency increases, a first breakdown (point B) occurs primarily as the result of inertia effects of the motor-load system. The portion of the curve between points B and C indicates that there will now be a time lag between the application of a change in input voltage and a resultant change in the motor speed. At point C a second breakdown may exist which is cumulative with the first and results in a rather steep slope in the curve. The second breakdown is basically the result of the reactance of the motor windings themselves.

As is brought out more fully in the aforementioned U.S. Pat. No. 3,935,520, normal motor control systems employ a speed feedback which is in opposition to a designated reference to provide stability; that is, the adjustment of the system is such that when the motor is operating at precisely the desired speed, the feedback signal and the reference signal are equal in magnitude but opposite in polarity such that there is no error signal. With reference still to FIG. 1, when system operation is along that portion of the curve defined by A and B, a large gain in the speed control loop is desirable so that a small deviation in motor speed will result in a very rapid correction to maintain the correct motor speed. However, as seen in FIG. 1, on those portions of the curve after the downbreaks have occurred, it is possible to develop what amounts to a 180° phase shift in the feedback signal with respect to the applied input voltage and if this were the case, the feedback signal instead of opposing the desired reference signal would in fact be added thereto thus compounding the error and making the total system unstable. In situations where this is a possibility, it is a necessity, in order to maintain stability, that the gain of the system be low.

As indicated, the FIG. 1 depiction defined by points A, B, C and D is typical of the transfer characteristic of a motor operating in the constant torque range. It is known, however, (as previously mentioned) that as soon as the motor operation is changed to the constant horsepower range in which the field weakening is utilized there exists another system gain factor which is combined into the system. The transfer characteristic of the motor-load system will, therefore, change.

FIG. 1 also illustrates a typical transfer characteristic of a motor-load system when the system is being operated in the constant horsepower range. This is shown by the line EFBCD. It is apparent from looking at this portion of FIG. 1 that the gain of the overall system has now changed radically and there is only a small portion, that shown by line segment EF, in which the gain is stable and with a frequency increase beyond point F there is a very pronounced slope. Thus, from the previous description it is evident that the possibility of instability is much higher and occurs at much lower frequencies when the operation of the motor is in the constant horsepower range.

Figure 2:
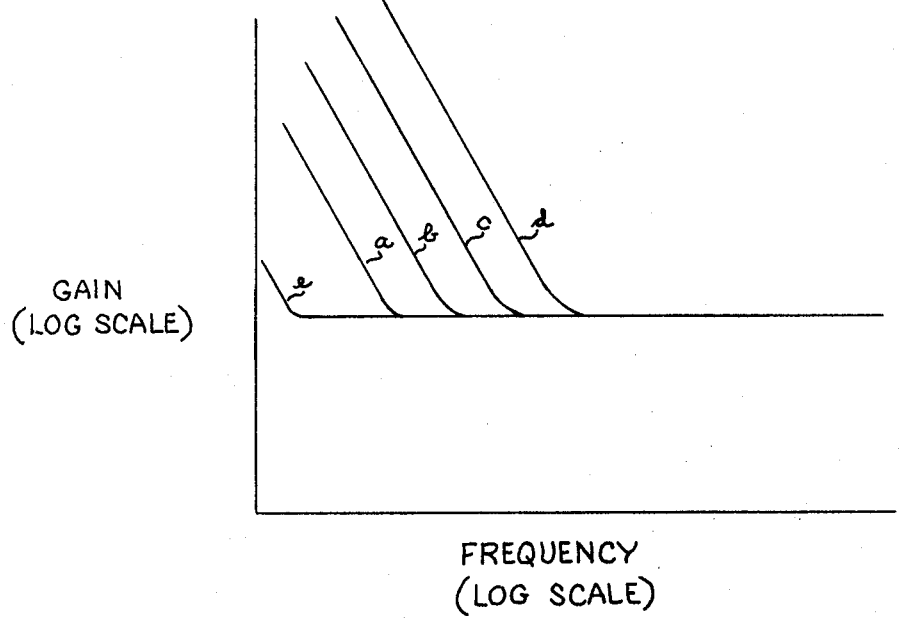
FIG. 2 is a Bode diagram showing the transfer characteristic of the speed control of the system of the present invention; and, FIG. 3 is a schematic diagram of the preferred embodiment of the present invention.

FIG. 2 illustrates a Bode diagram of the transfer characteristic of the circuit of the present invention. Those familiar with the aforementioned U.S. Pat. No. 3,935,520 will recognize the similarities between this figure and FIG. 3 of that patent. Here, as was the case in FIG. 1, on logarithmic scales, gain is plotted as the ordinate against frequency as the abscissa. The curves designated by $a$, $b$ $c$ and $d$ are identical to those of the aformentioned patent and demonstrate the gain of that circuit operable in the constant torque mode. Each of these curves $a$ through $d$ demonstrates a similar appearance of having a rather pronounced slope to a point after which the gain remains at unity with further increases in frequency. As was pointed out in the aforementioned patent, the selection of the lines $a$ through $d$ was a functiom of the single adjustment in the control circuit to optimize the operation of that system. It is apparent, however, that if one compares FIGS. 1 and 2 that the gain demonstrated by the slopes $a$ through $d$, while quite satisfactory for the constant torque region in which the system gain is essentially unity out to point B, may well be unsatisfactory when operation is moved into the constant horsepower range where unity gain exists only for the frequencies represented by line segment EF. After point F, the potential for instability is again present as described in the aforementioned patent.

In view of the foregoing, the present invention modifies the circuit of the aforementioned patent by providing, in response to a determination of a change in motor operation, a shift in the gain of the speed control portion of the circuit to place that circuit into an operational mode having a much lower gain at much lower frequencies. Specifically, as is shown by line $e$ in FIG. 2, the gain at lower frequencies is shifted back to the area corresponding to the horizontal portion EF in FIG. 1 to achieve overall system stability. That is, high gain is still provided at lower frequencies but the frequencies at which a high gain is present are much lower in the case of operation in the constant horespower mode that when the system is operating in the constant torque mode.

Figure 3:
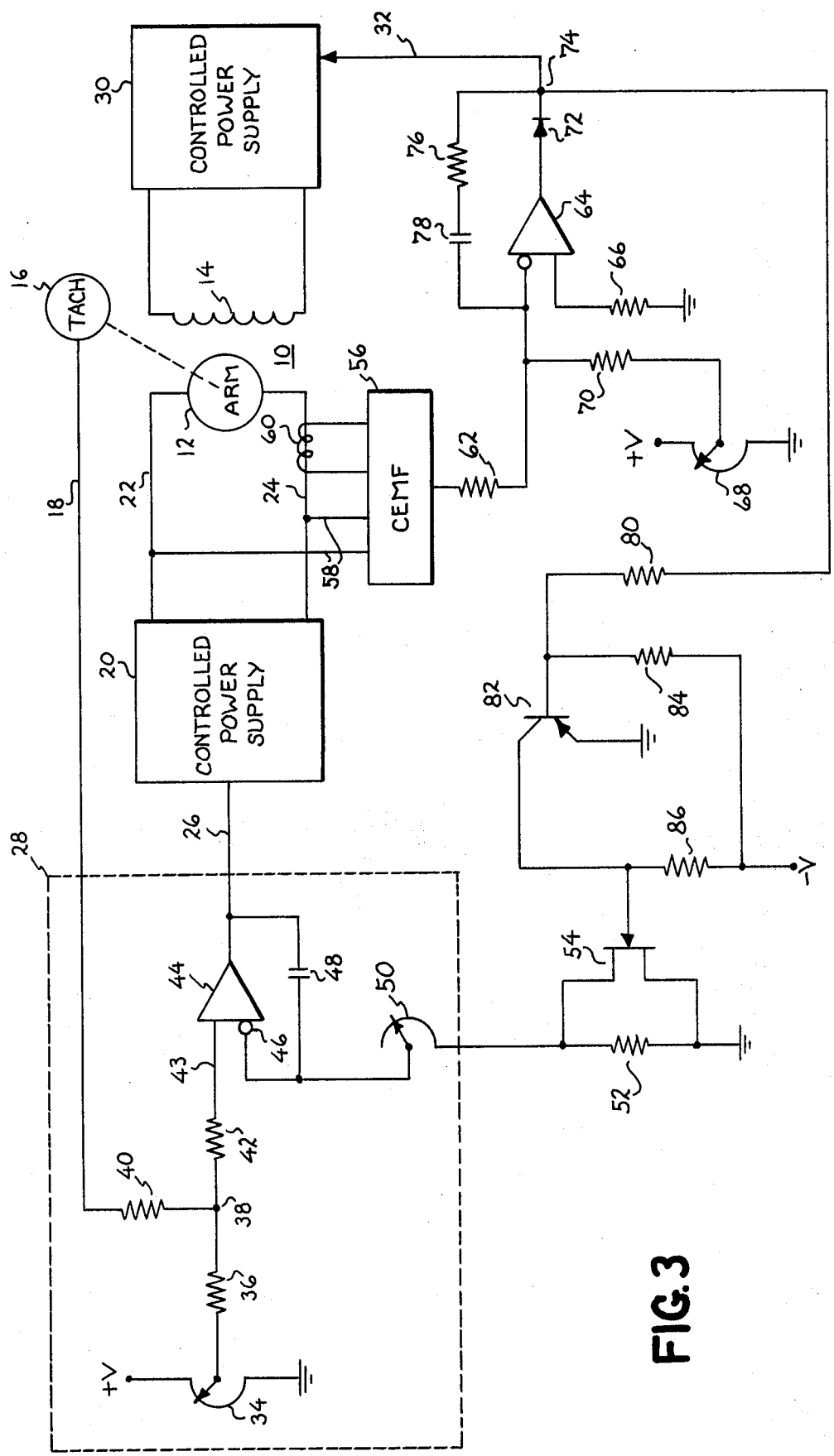

The desired results, as illustrated by FIG. 2, are achieved in accordance with the present invention, the preferred embodiment of which is illustrated in FIG. 3. Referencing now FIG. 3, there is provided a motor shown generally at 10 having an armature winding 12 and a field winding 14. A suitable load (not shown) is driven by the armature 12. A suitable means for providing a feedback signal proportional to the motor speed is indicated by a tachometer 16 driven by the armature as is indicated by the dashed line connecting these two elements. Tachometer 16 provides an output signal on line 18 which is proportional to the motor speed. It will, of course, be obvious to those skilled in the art that the tachometer 16 is merely exemplary and that other devices or methods could be employed.

Power is supplied to the armature 10 from a controlled power supply 20 by way of conductors 22 and 24. As is well known in the art, the speed of a separately excited direct current motor in the constant torque range is a function of the armature terminal voltage. The function of the controlled power supply 20, therefore, is to vary the voltage supplied to the armature 12 by way of conductors 22 and 24 in response to an input control signal applied to the power supply 20 by way of an input line 26. The signal on line 26 is the output of the speed control circuit shown partially within the dashed line block 28 which will be more fully explained hereinafter. The actual nature of the controlled power supply is not material to the present invention and may be any of several of those well known in the art. The power supply 20 may, for example, employ controlled rectifier devices which vary the percentage of total time that a d.c. source is connected to the motor in response to the input control signal. As another example, assuming an a.c. source were used, the power supply 20 could employ a controlled rectifier bridge which rectifiers are phase controlled to vary the d.c. output all in a manner well known in the art. The basic criterion, in this instance, is that the power supply output is variable in accordance with an input control signal.

The field winding 14 is supplied with power from a controlled power supply 30. The supply 30, as was the case with the supply 20, may be of any suitable type known in the art but normally would be a one-half, two-thirds or full wave thyristor bridge which serves to supply d.c. power to the field winding 14 from an a.c. source. These bridges are phase controlled so that the voltage to the field can be varied. The voltage applied to the field winding in the constant torque mode of operation of the motor is held constant and in the constant horsepower mode is varied. Accordingly, there is an input 32 to the controlled power supply 30 which, as will be more fully explained, serves to weaken the field of the motor at the appropriate time in the operational cycle when operating in the constant horsepower region.

The control signal on line 26 is derived from the speed control circuit of the present invention. Those familiar with the aforementioned U.S. Pat. No. 3,935,520 will recognize that portion within the block 28 is substantially identical in all material aspects to the speed control circuit of that patent. As shown in FIG. 3, the speed control circuit includes a means for providing a suitable reference voltage proportional to desired motor speed. This reference voltage is shown as being derived from a potentiometer 34 which is connected between a suitable reference voltage +V and ground. The wiper arm of the potentiometer is connected through a scaling resistor 36 to a junction 38. The speed feedback signal on line 18 is also applied to the junction 38 through a suitable scaling resistor 40. The value of the several components are chosen such that when the motor is operating at desired speed the voltage from the potentiometer 34 and that appearing on line 18, as seen at junction 38, are equal in magnitude and opposite polarity such that a zero voltage appears at that junction. Any voltage existing at junction 38 is applied via an input resistor 42 and line 43 to the noninverting input of an operational amplifier 44. A feedback path from the output of the amplifier 44 to the inverting input 46 thereof comprises a capacitor 48 so that under prescribed circumstances an integration function will be performed. The inverting input 46 of amplifier 44 is also connected to ground by way of a series path of a potentiometer 50 and a resistor 52. A suitable switching means showing as a field effect transistor (FET) 54 is provided to short circuit the resistor 52 when the FET 54 is in its conducting state. The operational mode of this FET will be explained hereinafter. The resistive path from the inverting input 46 to ground includes the effective values of potentiometer 50 and resistor 52 the latter being zero when the FET 54 is in its conducting state.

As can be shown, the portion of the circuit consisting of the amplifier 44, capacitor 48 and the resistive component including potentiometer 50 and resistor 52 form a circuit having a transfer characteristic defined by the equation $$G = \frac{1+R \cdot C \cdot j\omega}{R \cdot C \cdot j\omega};$$

wherein $G$ is the ratio of the output voltage of the amplifier 44 as seen on line 26 to the input voltage as seen on line 43, $C$ is the value of capacitor 48 and $R$ is the effective value of the resistive component (potentiometer 50 and resistor 52). It will be recognized that this transfer characteristic is identical to that specified in the aforementioned patent and it also will be recognized that the primary difference between the aforementioned patent and the presently being described invention, in this particular respect, centers around the inclusion of the resistor 52 and its ability to be switched into and out of the circuit in a selective manner.

It will be remembered from the earlier description that the present invention is primarily for control of motor system which is operable in both the constant torque and the constant horsepower modes. In the constant horsepower mode when the field is being weakened, it is necessary to maintain the counterelectromotive force (CEMF) of the motor at a constant value and this parameter is utilized, in the present invention, to determine the gain of the speed control circuit just described as well as to govern the application of power to the field winding 14. As shown in FIG. 3, there is provided a CEMF circuit 56 which may be any of those, known in the art, which outputs a signal proportional to the CEMF of the motor. This is accomplished, in the well-known manner, by subtracting from the value of the armature terminal voltage an amount proportional to the IR drop of the armature. Accordingly, there is shown as inputs to the CEMF circuit 56 a pair of input lines 58 which serve to provide to the circuit 56 a signal proportional to the armature terminal voltage. A signal proportional to armature current is diagramatically illustrated as being derived from a current transformer 60 which is coupled to one of the armature leads, for example, lead 24. The output of the CEMF block is provided by way of an input resistor 62 to the inverting input of an operational amplifier 64 which has its noninverting input connected to ground by way of a suitable resistor 66. As such, the input to amplifier 64 by way of resistor 62 will be a voltage signal which is proportional to the CEMF of the motor.

A reference signal which is proportional to the desired CEMF of the motor is also applied to the inverting input of amplifier 64. As illustrated, this reference signal is shown as being derived from a potentiometer 68 connected between a source of positive voltage +V and ground. Potentiometer has its wiper arm connected by way of an input resistor 70 to the inverting input terminal of amplifier 64. The polarities of the signals transmitted via resistors 62 and 70 are in opposition such that when the motor is operating at desired CEMF these signals are equal in magnitude and opposite polarity and no error signal is applied to the operational amplifier 64. (As illustrated in FIG. 3, the CEMF signal applied by way of resistor 62 will be negative.) Operational amplifier 64 has its output connected to the anode of a diode 72 the cathode of which is connected to a junction 74. Thus, only positive signals emanating from the amplitude 64 can reach the junction 74. A feedback circuit comprising a resistor 76 in series with a capacitor 78 is connected between junction 74 and the inverting input of amplifier 64 such that the amplifier 64 and its associated circuit provides an integrating, high gain, d.c. amplifier.

From the description thus far, it is seen that when the CEMF of the motor 10 exceeds a desired value there will be provided a positive output signal to the junction 74 which is applied as a control signal by way of line 32 to the controlled power supply 30. This signal, the magnitude of which will be a function of the amount of difference between the CEMF of the motor and the desired level, will serve to reduce the amount of power supplied to the field winding 14 by the supply 30 and thus weaken the field.

The signal appearing at junction 74 is also used as the initiating control signal for the controlling of the FET 54. As shown in FIG. 3, the positive signal appearing at junction 74 is applied by way of a suitable input resistor 80 to the base of a p-n-p transistor 82. The collector of the transistor 82 is connected to the base of the FET transistor 54 and is further connected to a source of negative potential (−V) by way of a resistor 86. The base of transistor 82 is further connected to the negative potential source −V by way of resistor 84 and its emitter is connected to ground. As illustrated in FIG. 3, FET 54 is of the N channel type and thus requires a negative signal to be applied at its base in order to maintain it in its nonconducting state. But, so long as transistor 82 is in its conducting state, the base of FET 54 will be held at ground potential. In this condition, the FET 54 will be in its conducting state and thus resistor 52 will not be included within the resistive component of the speed control circuit. When, however, a positive signal is applied by way of junction 74 and resistor 80 to the base of 82 and that value of that signal is sufficient to overcome the negative bias placed on that base by way of resistor 84, transistor 82 will not conduct and the base of FET 54 will be biased negative through resistor 86, turning that FET off. When FET 54 goes nonconductive, the short circuit existing around resistor 52 is removed and resistor 52 is now placed within the resistive component of the speed control circuit. This occurs as previously described when the system goes into the field weakening or constant horsepower mode of operation as determined in the manner previously described.

With reference once again to FIG. 2, remembering that the transfer function of the speed control circuit is defined by the equation $$G = \frac{1 + R \cdot C \cdot j\omega}{R \cdot C \cdot j\omega},$$

it is seen that with the increase of the resistive component of the circuit occasioned by the inclusion of resistor 52, the transfer characteristic of the control circuit will change so that operation now occurs as illustrated by line e. Line e shows that a gain greater than unity exists for only very low frequencies and thus stability and accurate speed control are achieved for both constant torque and constant horsepower modes of motor operation.

Thus it is seen that there has been provided a system which in the constant torque region, provides for good stability by controlling the gain and which, when switched to the field weakening or constant horsepower mode of operation, retains stability by a quantum jump in reducing the gain of the circuit so that high frequency components of the input signals to the speed control circuit do not result in overall system instability.

While there has been shown and described what is at present considered to be the preferred embodiment of the invention, modifications thereto will readily occur to those skilled in the art. For example, a particular switching arrangement was shown for varying the gain of the speed control circuit and it is obvious that other forms of switching circuits could be utilized with equal facility. It is, therefore, desired that the claims included within this specification not be limited to the specific embodiment shown but that they be interpreted in the true spirit and scope of the invention.

What is claimed is:

1. A control system for a direct current motor having separately excited armature and field windings comprising:
    (a) a controlled power supply for supplying variable voltage power to said armature windings;
    (b) means to provide a feedback signal proportional to motor speed;
    (c) a speed control circuit for developing a control signal operable to govern the operation of said power supply to thereby control the voltage furnished to said armature winding, said control circuit including,
        (1) means to provide a reference signal proportional to desired motor speed, and
        (2) comparison means to compare said speed reference signal with said feedback signal to produce said control signal, said comparison means having a transfer characteristic providing a relatively high gain in response to relatively low frequency input signal components and a relatively low gain in response to relatively high frequency input signal components;
    (d) means responsive to the counterelectromotive force of said motor to provide an output signal when said force exceeds a predetermined level; and,
    (e) means responsive to said output signal to reduce the low frequency gain of said comparison means.

2. The invention in accordance with claim 1 wherein said comparison means includes a resistive component (R), a capacitive component (C) and has a transfer characteristic (G) defined by the equation, $$G = \frac{1 + R \cdot C \cdot j\omega}{R \cdot C \cdot j\omega}.$$

3. The invention in accordance with claim 2 wherein the means responsive to said output signal includes means operative to change the value of said resistive component (R).

4. The invention in accordance with claim 2 wherein the means responsive to said output signal includes switching means for selectively switching a resistive component into and out of said comparison means to thereby change the value of said resistive component (R).

5. The invention in accordance with claim 1 further including a second controlled power supply operable in response to said output signal to weaken the motor field to thereby maintain the motor counterelectromotive force substantially constant.

6. The invention in accordance with claim 1 wherein said comparison means includes a variable gain circuit to develop said control signal, said variable gain circuit including an operational amplifier having a capacitor connected in parallel therewith and a resistance connected between said amplifier and a point of fixed potential, and wherein said means responsive to said output signal acts to change the value of said resistance.

7. The invention in accordance with claim 6 including means to change the value of said resistance in a step function.

8. The invention in accordance with claim 7 wherein said last recited means includes a resistor and means to short circuit said resistor in the absence of said output signal.

9. The invention in accordance with claim 8 wherein the means to short circuit includes a switch connected in parallel with said resistor.

10. The invention in accordance with claim 9 wherein said switch is a field effect transistor.

11. A control system for a direct current motor having separately excited armature and field windings comprising:
    (a) selectively operable means for applying power to said armature and field windings;
    (b) means to develop a signal representing the counterelectromotive force of said motor;
    (c) means to determine when the counterelectromotive force of said motor exceeds a predetermined value and to provide an output signal proportional thereto;
    (d) means to develop a feedback signal proportional to motor speed;
    (e) control means responsive to said feedback signal to provide a control signal for controlling the power supplied to said armature winding, said control means having a gain which varies with frequency; and,
    (f) means responsive to said output signal to reduce the low frequency gain of said control means.

12. The invention in accordance with claim 11 wherein said control means includes a resistive component (R), a capacitive component (C) and has a transfer characteristic defined by the equation, $$G = \frac{1 + R \cdot C \cdot j\omega}{R \cdot C \cdot j\omega}.$$

13. The invention in accordance with claim 12 wherein the means responsive to said output signal includes means to change the value of said resistive component (R).

14. The invention in accordance with claim 13 wherein said output signal is further connected to the means for applying power to said field winding to effect a reduction in the voltage applied to said field winding.

* * * * *